(12) United States Patent
Young et al.

(10) Patent No.: US 8,170,900 B2
(45) Date of Patent: May 1, 2012

(54) SUPPLY CHAIN DISCOVERY SERVICES

(75) Inventors: Michael Young, Toronto (CA); Frank Thompson, Toronto (CA)

(73) Assignee: Afilias Limited, Dublin (IE)

( * ) Notice: Subject to any disclaimer, the term of this patent is extended or adjusted under 35 U.S.C. 154(b) by 283 days.

(21) Appl. No.: 11/923,084

(22) Filed: Oct. 24, 2007

(65) Prior Publication Data

US 2008/0109411 A1    May 8, 2008

Related U.S. Application Data

(60) Provisional application No. 60/862,656, filed on Oct. 24, 2006.

(51) Int. Cl.
G06Q 10/00    (2006.01)
G06F 15/16    (2006.01)

(52) U.S. Cl. ........................... 705/7.25; 709/230

(58) Field of Classification Search ............... 707/600, 707/661
See application file for complete search history.

(56) References Cited

U.S. PATENT DOCUMENTS

| | | | |
|---|---|---|---|
| 6,668,253 B1 * | 12/2003 | Thompson et al. ................... 1/1 |
| 7,657,777 B2 * | 2/2010 | Wong et al. ........................ 714/2 |
| 2003/0088433 A1 * | 5/2003 | Young et al. ........................ 705/1 |
| 2003/0227392 A1 * | 12/2003 | Ebert et al. ............... 340/825.49 |
| 2004/0206824 A1 * | 10/2004 | Lapstun et al. .......... 235/462.44 |
| 2004/0225637 A1 * | 11/2004 | Heinzel et al. ..................... 707/1 |
| 2006/0111960 A1 * | 5/2006 | Chess et al. ..................... 705/10 |

FOREIGN PATENT DOCUMENTS

| | | |
|---|---|---|
| CA | 2394483 A1 | 6/2001 |
| CA | 2423969 A1 | 4/2002 |
| EP | 1566756 A1 | 8/2005 |
| WO | 02/47048 A2 | 6/2002 |
| WO | 2006036898 A2 | 4/2006 |

OTHER PUBLICATIONS

Unknown, EDI Basics, 2010, GXS Ltd., http://www.edibasics.co.uk/.*
Product Lifecycle Management, Accessed Feb. 6, 2011, date unknown, http://en.wikipedia.org/wiki/Product_lifecycle_management.*
PCT International Search Report and Written Opinion issued by the Canadian Intellectual Property Office dated Feb. 12, 2008 for corresponding International Application No. PCT/CA2007/001894 filed Oct. 24, 2007.

(Continued)

*Primary Examiner* — Jason Liao
(74) *Attorney, Agent, or Firm* — Gowling Lafleur Henderson LLP (57) ABSTRACT

A discovery server is provided for tracking an object in a supply chain in accordance with a plurality of predefined events. The object is identifiable by an object identifier. The discovery server comprises the following elements. A communication interface is configured to communicate with each of a plurality of partners in the supply chain using a predefined protocol. A data store is configured to store events for the object, the events being received from the plurality of partners. Each event stored in the data store an object identifier, a life cycle step, a partner identifier and an timing identifier. Also, a processor is configured to search the data store in response to an inquiry regarding the object.

15 Claims, 6 Drawing Sheets

OTHER PUBLICATIONS

Verisign EPC Network Services, "EPC Information Service Implementation Guide", version 1.5, VeriSign, Aug. 2004, http://www.verisign.com/static/016142.pdf.

Ken Traub et al., "The EPCglobal Architecture Framework", version 1.0, EPCglobal, Jul. 1, 2005, http://www.epcglobalinc.org/standards/architecture/architecture_1_2-framework-20070910.pdf.

VeriSign, Press Release, "VeriSign Announces Winner of EPC Application Developer Contest", Sep. 14, 2005. http://www.verisign.com/verisign-inc/news-and-events/news-archive/us-news-2005/page_035373.html.

EPCglobal, "Object Naming Service (ONS)", version 1.0, Oct. 4, 2005, http://www.epcglobalinc.org/standards/ons/ons_1_0-standard-20051004.pdf.

VeriSign, "VeriSign Discovery Services: Discovery Service Implementation Guide", version 1.0, Nov. 2004, http://www.versign.com/stellent/groups/public/documents/guides/029243.pdf.

Extended European Search Report issued by the European Patent Office dated Aug. 29, 2011 for corresponding European Patent Application No. 07816044.7.

* cited by examiner

| Sample discovery service event query results: | | | | |
|---|---|---|---|---|
| EVENT 1 | EVENT 2 | EVENT 3 | EVENT 4 | EVENT 5 |
| Create event: urn:ads:object:create | Transfer event: urn:ads:object:in | Transfer event: urn:ads:object:out | Transfer event: urn:ads:object:in | Terminate event: urn:ads:object:cease |
| Injected into ADS at: 2007-07-17T18:54:13 | Injected into ADS at: 2007-07-17T18:56:11 | Injected into ADS at: 2007-07-19T07:25:46 | Injected into ADS at: 2007-07-19T07:45:25 | Injected into ADS at: 2007-08-25T10:35:08 |
| Event expiry: 2007-10-17T18:54:13 | Event expiry: 2007-10-17T18:56:11 | Event expiry: 2007-10-19T07:25:46 | Event expiry: 2007-10-19T07:45:25 | Event expiry: 2007-11-25T10:35:08 |
| Injected by: Partner Name & User Name | Injected by: Partner Name & User Name | Injected by: Partner Name & User Name | Injected by: Partner Name & User Name | Injected by: Partner Name & User Name |

SUPPLY CHAIN DISCOVERY SERVICES

The present invention relates generally to supply chain management and specifically to a system and method for managing dynamic events by partners in a supply chain. The present invention claims priority from U.S. Provisional Application 60/862,656 filed Oct. 24, 2006.

BACKGROUND

In many cases, Radio Frequency Identification (RFID) technology is part of a solution to solve the communication challenges within supply chains. RFID tags enable supply chain partners to track business data associated with specific identifiers, thus providing item-level tracking capabilities with identifiers that conveniently do not require a line of sight to be read. This technology helps to increase the flow of goods and services within supply chains, increase reliability and reduce the cost of doing business.

Supply chain partners generally know where their product was immediately before they receive it, and they know where they send it. The problem lies when something goes wrong within the chain of possession of that product, such as damage, loss, or mishandling, and downstream partners request explanations from previous partners in the chain. Without a complete historical view of a product's life cycle, the process of investigating where a problem occurred can be time consuming and costly.

EPCglobal is a standards organization for developing and promoting the use of the Electronic Product Code™ identifier within RFID solutions. The development of the existing EPCglobal architecture includes the introduction of the EPC Information Service (EPCIS). The EPCIS includes a standardized set of interfaces, such as an event capture interface and a query interface, as well as a data model that support sharing of information. EPCIS was designed to help supply chain partners communicate using one global Object Naming Service (ONS).

The ONS is a master lookup service that stores either the birth record or, in some cases, the most recently recorded event record associated with an object identifier. This allows users to determine the point of origin of an RFID tag. While the ONS concept was created to enable sharing of product related information between supply chain partners, its limitations have kept it from becoming widely adopted.

Specifically, the ONS lacks a life cycle record and proper security. The record of an identifier in the ONS does not include information about the progressive life cycle of the product and its associated services. Without a proper life cycle record, partners receiving goods have no way of performing audit control and compliance checks to ensure the quality and integrity of their products. Also, with such a contracted view of the supply chain events, investigating loss or damage of goods can be expensive.

Further, because ONS is an open query system, it stores records for all identifiers, and anyone with access to the ONS can view those records. Without proper security, the confidentiality of a partner's competitive business data is severely compromised.

Accordingly, many of the RFID implementations that have taken place to date have been at large companies or organizations with the reach and power to dictate which solutions must be in place up and down the supply chain. Within these closely managed supply chains, large, enterprise-level solutions offering end-to-end visibility have been adopted. These "all-in-one" solutions provide visibility and benefits throughout the supply chain, but limitations arise in many cases, such as: when supply chains are loosely coupled; when there are competitors sharing the supply chain; and when direct connectivity between back-end systems is not an option.

Further, these solutions tend to be difficult to integrate with existing legacy systems, and require additional time and money to get them operational. All the partners in a supply chain need to communicate with each other to manage their business efficiently, and the above mentioned issues can impede this exchange of information.

Accordingly, it will be appreciated that the growing complexity of today's RFID supply chain networks has created the need for more advanced technology that solves the problems associated with managing and sharing large amounts of data.

When communication between supply chain partners fails, the flow of critical business data within these large and multifaceted networks can slow down or halt altogether. Supply chain partners currently have difficulty linking their data with that of other partners. Without upstream and downstream visibility of event data, partners have no traceable audit trail. Partners also cannot be guaranteed that their proprietary data will remain secure and confidential when using existing technologies.

Therefore, it is an object of the present invention to obviate or mitigate at least some of the above-mentioned disadvantages.

SUMMARY OF THE INVENTION

Accordingly, the present invention provides a solution that links together business applications that partners use to collect and store their business data. This linking layer, referred to as discovery services, sits above the business application level and provides the ability to archive historical business data about the life cycle events associated with products traveling through a supply chain. Discovery services enable supply chain managers to realize the benefits of affordable, complete object identification solutions.

In accordance with an aspect of the present invention there is provided a discovery server for tracking an object, identifiable by an object identifier, in a supply chain in accordance with a plurality of predefined events, the discovery server comprising: a communication interface configured to communicate with each of a plurality of partners in the supply chain using a predefined protocol; a data store configured to store events for the object, the events being received from the plurality of partners, wherein each stored event comprises an object identifier, a life cycle step, a partner identifier and an timing identifier; and a processor configured to search the data store in response to an inquiry regarding the object.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
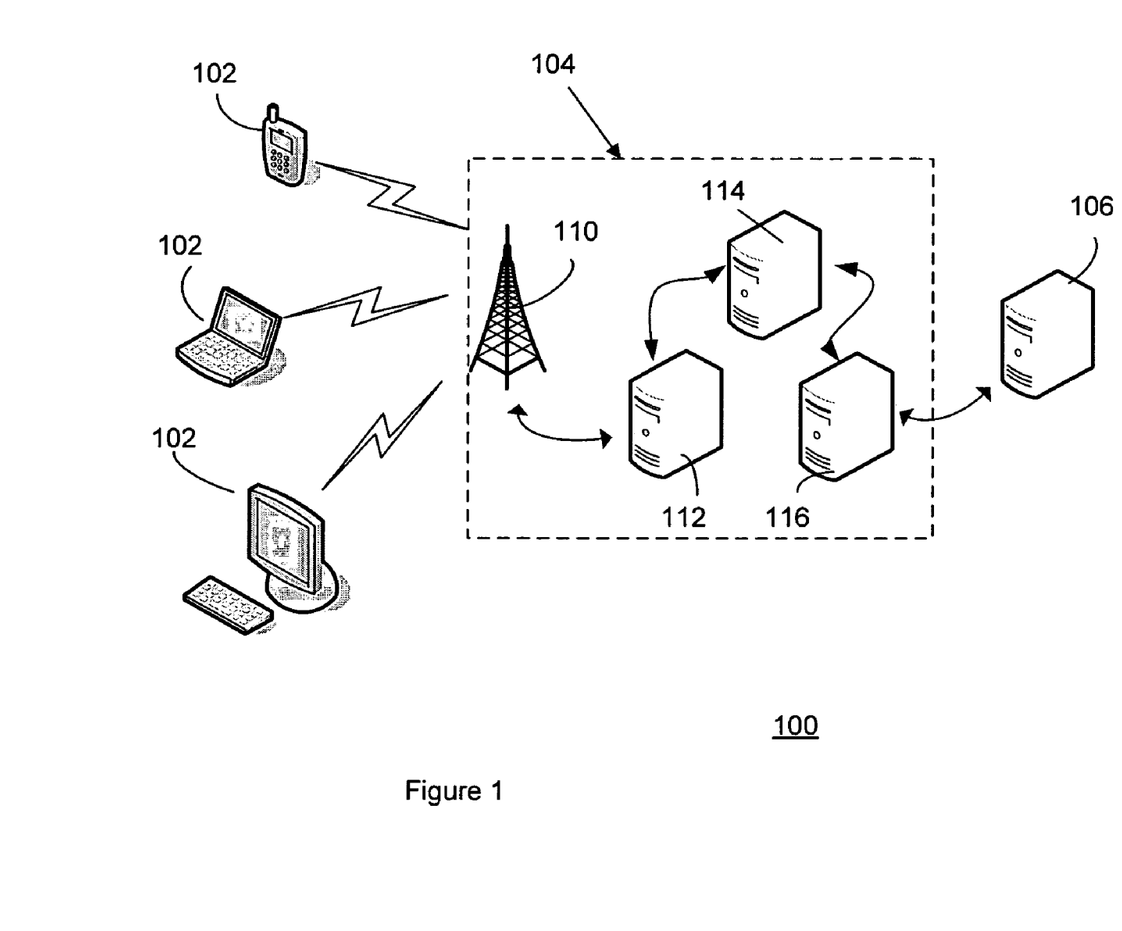
FIG. 1 is a block diagram of a network infrastructure.

For convenience, like numerals in the specification refer to like structure in the drawings. Referring to FIG. 1, a system for providing discovery services to a plurality of partners in a supply chain is illustrated generally by numeral 100. The system 100 includes a plurality of computing devices 102, a communication network 104 and a discovery server 106.

The computing devices 102 refer to any computing device that may be used by one of the partners for tracking a RFID or agnostic product identifier and include, for example, personal computers (both desktop and notebook), personal digital assists (PDAs), smart phones, mobile scanning devices and the like, as will be appreciated by a person of ordinary skill in the art.

The computing devices 102 are in communication with the discovery server 106 via the communication network 104. Accordingly, the communication network 104 may include several components such as a wireless network 110, a relay 112, a corporate server 114 and/or a mobile data server 116 for relaying data between the computing devices 102 and the discovery server 106. Further the communication network may comprise one or both of a public network, such as the Internet, or a private network. As is known in the art, there are a number of way to configure the communication network 104, which is beyond the scope of the present invention.

The discover server 106 is a server configured to provide discovery services. In the present embodiment, a discovery services application is executing on the discovery server 106. The discovery services application communicates with the computing devices 102 to retrieve and transmit information associated with various RFIDs and or agnostic identifiers.

The discovery services provide a chain of events surrounding an RFID or agnostic identifier tagged product as it travels through the supply chain. Each supply chain member can add events to the discovery service. Each supply chain member can also query the discovery services to examine the history of a particular RFID or agnostic identifier tagged product, or could be notified of the event via publish/subscribe notification, as will be described in detail.

Figure 2:
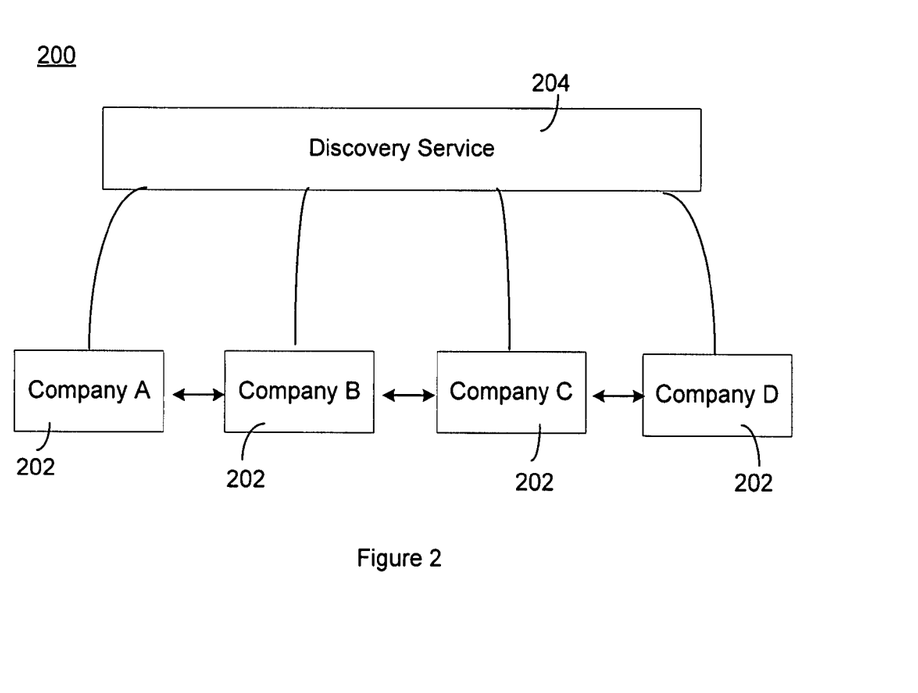
FIG. 2 is a block diagram of a supply chain network.

Referring to FIG. 2, a block diagram illustrating a supply chain network implemented using discovery services is shown generally by numeral 200. In the present embodiment, the supply chain network 200 includes a plurality of partners 202, each in communication with the discovery service 204.

Each partner 202 includes a gateway to the discovery services 204. That is, each partner 202 is provided with a discovery service interface. The discovery service interface is configured to integrate with an already existing business application executing on the partner's computing device 102. Accordingly, the discovery service interface facilitates communicating data between the computing device 102 at the partner 202 and the discover service 204 at the discovery server 106.

In order to facilitate communicating with a plurality of different business applications operating at a plurality of different partners, the discovery services 204 are based on a predefined protocol. In the present embodiment, the protocol used is the Extensible Supply-chain Discovery Service (ESDS) Protocol first proposed by Afilias in April 2007, and last updated in October 2007, in an Internet Draft for review by the Internet Engineering Task Force (IETF). However, it will be appreciated by a person of ordinary skill in the art that other protocols can be used.

Since the discovery services communicate using predefined protocols, custom discovery services interfaces can be created for business applications that are particularly complex, such as legacy applications. This provides a convenient mechanism for communicating between loosely coupled partners 202 within a supply chain network 200. Accordingly, it will be appreciated that, subject to authentication and permissions, a partner 202 can post events associated with a supply chain network 200 and inquire about events posted by other partners 202 to the supply chain 200.

The process of setting up a supply chain network 200 is potentially complex, and involves actions on the part of many different people representing the partners 202 involved with the network 200. In general, there are two types of administrators who can configure different parts of the supply chain network 200, a supply chain administrator and partner administrators.

The initial creation of the supply chain network 202 is performed by the supply chain administrator. This task includes "creating" partners 202 involved in the supply chain network 202.

Once partners 202 are created, the partner administrators can define users, roles and post events based on the individual needs of the organizations they represent. Users are people or computer systems that represents a partner. Users are assigned roles that dictate the operations it may invoke. Generally, a user belongs to only one partner 202. Roles define the permissions assigned to the user based on the operations the user needs to access in the supply chain network 200. Each partner can create any number of users, all of whom are subject to a granular set of access rules called roles.

Events represent steps in the life cycle of a tracked object (supply) or service. Each event carries two time stamps indicating the instant at which it was generated by the client system and also the instant the event was injected into the discovery server 106.

There are two primary types of events: objects events and void events. Object events are captured when the supply chain network 200 records a new life cycle step for an object. The event consists of a supply chain specific life cycle step, such as create, in, out, or terminate, all of which are customizable by supply chain administrator. The life cycle steps will be described in detail later in the description.

Void events amend a specific object event to indicate that the event was posted in error. Accordingly, the object event that is voided will not appear in response to an event query. The void event specifies an event identifier and a reason for the void to facilitate audit control and compliance capability.

It should be noted that the supply chain administrator can also complete these tasks of the partner administrator. However, it is intended that the partner level configuration be completed by representatives of each partner 202.

Figure 3:
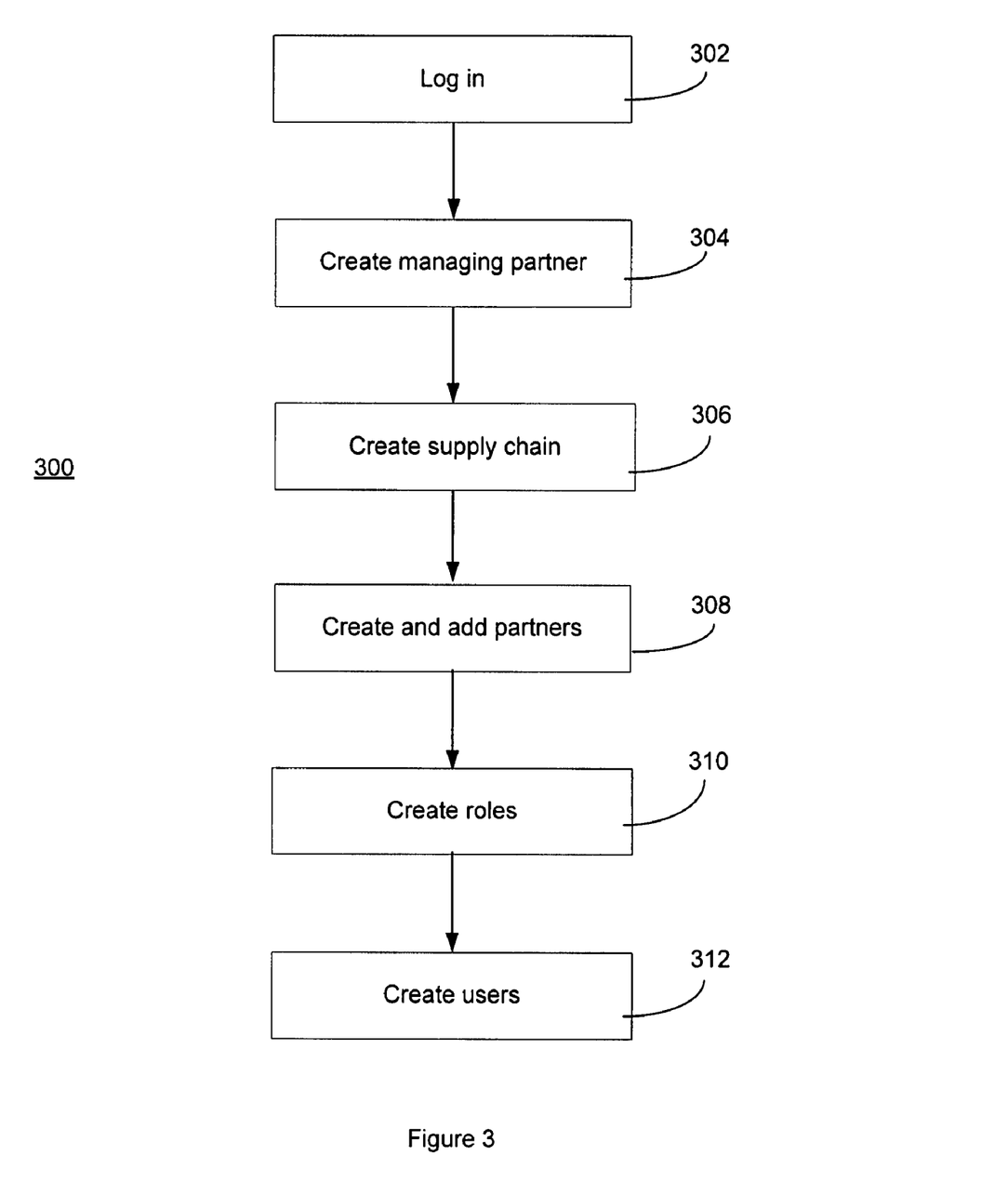
FIG. 3 is a flow chart illustrating creation of a supply chain network in a discovery service.

Referring to FIG. 3, a flow chart illustrating the process of establishing a supply chain is shown generally by numeral 300. In the present embodiment, the discovery services includes a web-based administration interface that enables a supply chain network to be established and managed by the supply chain administrators and the partner administrators.

Accordingly, in step 302, the supply-chain administrator logs in to the administration interface. In the present embodiment the supply chain administrator logs in by navigating a web-browser to a web-site identified by a predefined (Uniform Resource Locator) URL. The supply-chain administrator is verified using a Secure Sockets Layer (SSL) certificate pre-installed on the administrator's equipment. Once verified, the supply-chain administrator will be asked for a user identifier and a corresponding password.

In step 304, the supply-chain administrator creates a managing partner. The managing partner is a partner that has the authority to create and configure the supply chain to which it is assigned. There can be more than one partner that is a managing partner. Typically there is one but the supply-chain managing partners can themselves add other partners to the supply-chain or do other administration tasks to the supply-chain in question In step 306, the supply-chain administrator creates a supply chain. As part of the process of creating the supply chain, a supply chain name and the managing partner are assigned. Preferably, the supply chain name is meaningful.

In step 308, the supply-chain administrator adds partners to the supply chain. Each organization involved in the supply chain is created as a partner to be able to manage its own users and events. The created partners are then added to the supply chain.

In step 310, each of the partner administrators can create roles. As previously described, a role is a set of permissions that is assigned to a user. All users have an assigned role in order to identify how they are allowed to interact with the discovery service. Accordingly, different roles created provide a variety of different permission levels for the users.

In step 312, each of the partner administrators can create users. Based on the needs of the organization, partners can include any number of users. However, a user can only be part of one partner. When setting up a user, the partner administrators provide a password and details from the authorized SSL certificates that will be used to identify the user.

The role, user, partner, and supply-chain object data work together to create an access control list (ACL) feature that allows the system to audit the event and data manipulation records. None of these objects are deleted from the system. Thus a link or reference to these objects will remain for future lookups with archived data. These object data will have a status that can be set to active or inactive which allows a soft delete from further modifications or associations. The discovery service 204 will enforce the ACL along with any other event restriction rules for allowing access to its data.

Once the supply chain network 200 has been established, the partners 202 are able to post events to the discover server 106 as a supplies move through their facilities. The complexity of post events will depend on the complexity and regulation required for the supply chain network. For example, a relatively simple supply chain network may only need to know when handling of a supply is initiated, when the supply is transferred, or when handling of the supply is completed. A more complex supply chain network may need additional events each time the supply is handled. Therefore, the requirements for posting events as well as the different stages in a life cycle of the supply may vary between different supply chains.

For ease of explanation, the description refers to supply chains having relatively simple event life cycles and, thus, relatively simple posting requirements. For example, the present embodiment includes only four steps in a life cycle: create; transfer-in; transfer-out; and terminate. However, more complex life cycles including a greater number of life cycle steps will be apparent to a person of ordinary skill in the art.

Accordingly, when a partner 202 posts an event, the partner enters at least a minimum amount of information required for the particular supply chain network. In the present embodiment, the minimum information includes selection of a life cycle step and entry of an object identifier, two time stamps, an event class, message digest or hash. It will be appreciated that the data field that make up the minimum amount of information may vary depending on the implementation. The partner 202 selects what time to enter as the client time stamp. However, the system will default the time for the time stamp injected into the discovery server 106. The message digest or hash field is used to sign the event data thus ensuring that the event data is not manipulated by any other partner of the supply-chain network.

In addition to the minimum required information the partner has the option to include additional information when posting an event. The additional information can be used to direct an enquirer to potential answers to more complex queries. In the present embodiment, a special services option provides the partner with a field to enter an information source that can provide more information about the event.

In the present embodiment, each information source is associated with a type field, and a location field. The type field identifies the type of information source that is defined. Examples of information sources types include an EPCIS repository, a corporate web site or any other service represented by a Uniform Resource Identifier (URI) such as epcis, ds, http, and mailto, for example. The location field defines the location of the information source using a URI.

The type of additional information provided by the information sources varies between implementations. One example of the addition information may be details of the supply, such as a list of components used to make the supply and their corresponding RFIDs. In another example, the additional information may provide details about the condition of the supply. Therefore, if a supply arrives in poor condition at a partner, the partner can query the condition of the supply at previous partners to determine where the supply may have been damaged. It will be appreciated by a person of ordinary skill in the art that these are merely examples and a various permutations and combinations of different information can be made available to the partners as desired.

Figure 4:
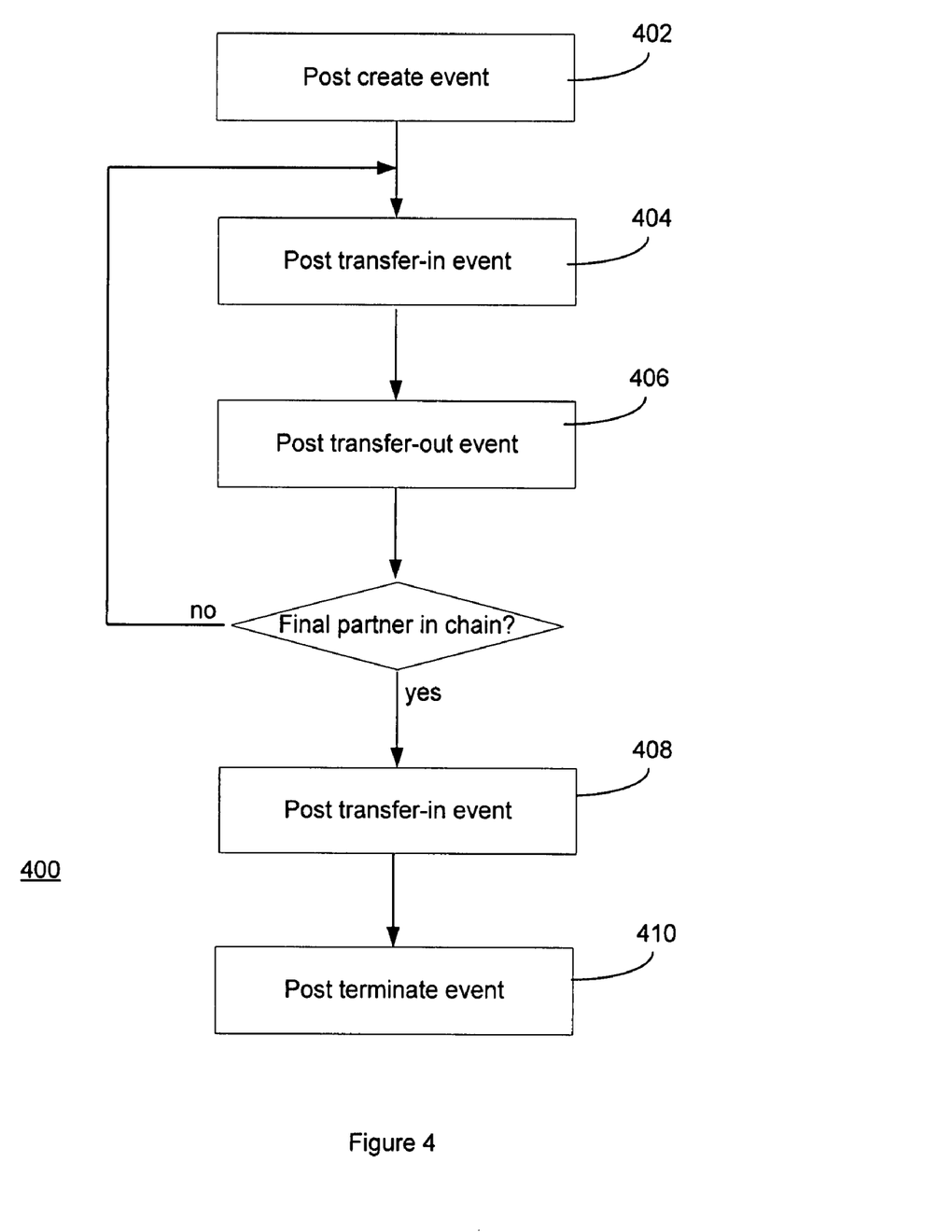
FIG. 4 is a flow chart illustration tracking a product or supply as moves through the supply chain illustrated in FIG. 2.

Referring to FIG. 4, a flow chart illustrating a life cycle of a supply is shown generally by numeral 400. As with all examples in this description, the following example is shown for illustrative purposes and in no way provides any limitations on the invention itself. At step 402, a first partner 202 in the supply chain network 200 posts a create event with the discovery server 106. The create event indicates that the supply is entering the supply chain At step 404, the first partner 202 in the supply chain network 200 posts a transfer-in event to the discovery server 106. The transfer-in event indicates that the supply was received at the partner 202.

At step 406, once the first partner 202 has finished with the supply, it ships the supply to the next partner and posts a transfer-out event to the discovery server. The transfer-out event indicates that the supply was shipped from the partner.

Steps 404 and 406 are repeated for each partner 202 in the supply chain network until the final partner in the supply chain network is reached. At step 408, the last partner 202 in the supply chain network 200 posts a transfer-in event to the discovery server 106. The transfer-in event indicates that the supply was received at the partner 202.

At step 410, the last partner 202 in the supply chain network 200 posts a terminate event with the discovery server 106. The terminate event indicates that the supply is exiting the supply chain.

Each of the events are posted and stored on a data store by the discovery server 106. In accordance with the present embodiment, configurable database table partitioning is provided for events, queues and logging tables. For example, events can be broken down into classes based on the object being tracked. For example, if the object is something that is subject to a large number of transactions and a relatively short life cycle, the database tables can be partitioned daily. Alternatively, if the object is something that is subject to few number of transactions and a relatively long life cycle, the database tables can be partitioned annually. Intermediate classes that partitions the database tables weekly and monthly are also provided. The classes can be dynamically assigned to objects by the supply chain administrator, for example, and can be modified if necessary.

Additionally, each class can have an associated billing and retention period. That is, a supply chain network can be charged in accordance with its relative access to the discovery server 106. Accordingly, statistics can be gathered using a networked group communication system to allow high volume data collection on a publish/subscribe basis. This statistical data will be used for billing, reporting and other data mining needs.

In the present embodiment, posted events are not deleted. If an event is entered in error, it can be voided by post a void event as previously discussed. However, events can have rules applied to them by a the discovery server 106 which will prevent their access by users, partners, and/or supply-chain networks based on a certain set of criteria. In one example, if a partner has not paid a recent bill, rules to hide events from the partner can invoked. Accordingly, if the partner queries the discovery server 106, as will be described in detail, no results will be returned.

As described above, event injection into the discovery server 106 will persist an event records. Further, the event records can be pushed to a series of queues to be processed by notification systems. For example, a first notification system provides ONS notification. If the event record matches a predefined life cycle criteria, the event record is submitted to the ONS notification system, which pushes the event record to an ONS. Thus, for example, when a "create" event is posted to the discovery server 106, the event record is pushed to the ONS.

As another example, a second notification system provides messaging service push or publish notification. In this example, each user subscribes to specific event records or topics. When event records are injected into the discovery server 106 that match the subscription, they are pushed into the messaging service queue (MQ) and delivered to the user, provided the proper user credentials are supplied.

Since the events are stored by the discovery server 106, it is possible for partners to query the discovery server 106 for the history of a given object. For example, if one of the partners is expecting an object that has not yet arrived, the partner can query the discovery server to determine its last appearance.

In the present embodiment, the query includes a desired object identifier, a date for the posted events and a supply chain identifier. The desired object identifier may include only a partial identifier if the entire object identifier is unknown.

Figure 7:
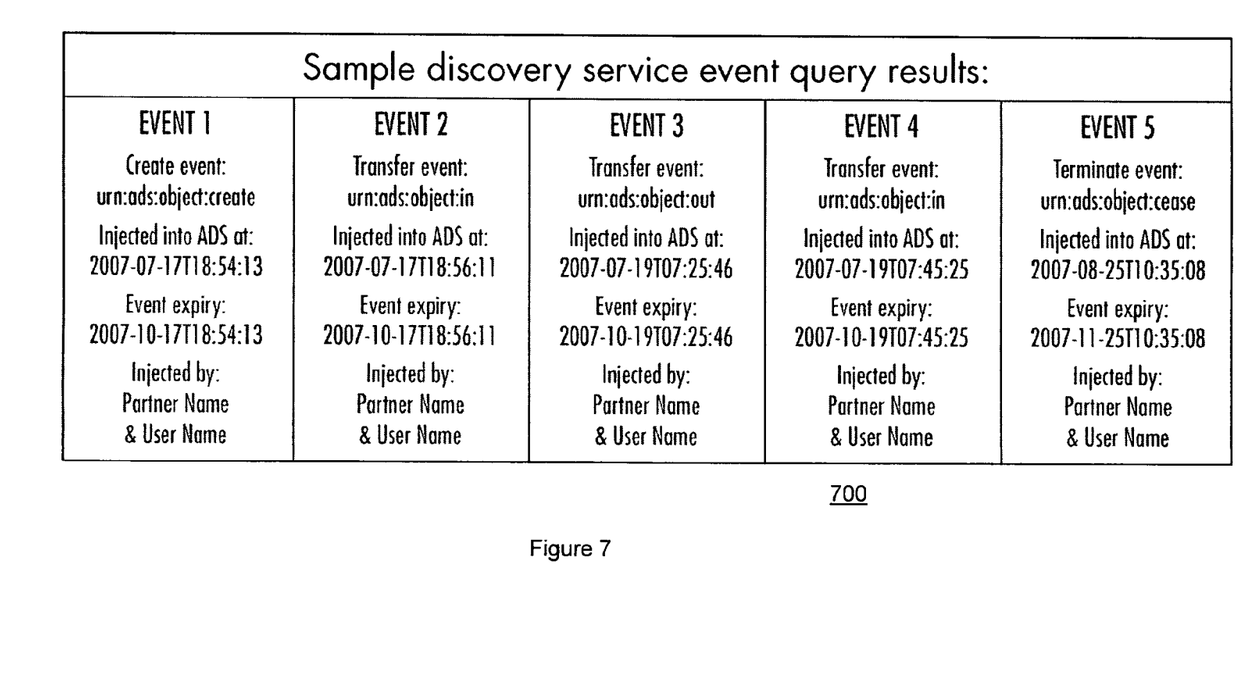
FIG. 7 is an example of a query result set.

Referring to FIG. 7, a sample query response is illustrated generally by numeral 700. In the present example, the response includes a list of events that match the search criteria. Additionally, the minimum data required for each event, such as event type, post date, expiry date, and partner name, are returned for each event. Although not previously discussed, the partner name may be explicitly included in the events submitted by the partners. Alternatively, since the partner name is known by the discovery service it may automatically be added upon receipt of the event.

Further, as previously described with reference to posting an event, the event may be associated with additional information. Accordingly, the additional information, or links thereto, may also be returned as part of the search results.

However, it will be appreciated that there are a number of different ways to determine that the additional information is to be retrieved. For example, in one implementation the additional information, or links thereto, is only retrieved if the partner submitting the query explicitly requests it as part of the search criteria. In another implementation, the additional information, or links thereto, is automatically retrieved but not presented to the partner until further requested.

Further, it will be appreciated that there are a number of different ways to present the additional information to the partner. For example, in one implementation the additional information is automatically presented to the partner in accordance with the predefined priority sequence. Each information source is sequentially accessed via its corresponding URL. If a security level has been applied to the information source, the partner is required to provide the necessary credentials, such as at least one of a user ID, password or certificate. In another implementation, the URLs of the information sources are retrieved and presented to the partner as part the query response. In this implementation, the information sources are accessed when a user selects one of the URLs. Similar to the previous implementation, if a security level has been applied to the information source, the partner is required to provide the necessary credentials.

Accordingly, it will be appreciated that by quickly pinpointing where supplies were last seen, a partner 202 spends less time tracking down the source of a problem that may arise. Ultimately, employing the tracking features of discovery services places the responsibility on all supply chain partners to ensure that all objects moving through their custody are accounted for at all times.

Further, secure data sharing is provided to the partners on a granular level. That is, data sharing can be restricted by supply chain, by partner or by event. For example, it may be possible for companies that compete in one area to be part of a common supply chain network in another area. Accordingly, on a supply chain level, the competing partners can be restricted to access information for supplies injected into the discovery server 106 only for the common supply chain. In this example, query results may not be shown to a querying partner if the object identifier for the result is not included in a common supply chain network.

On a partner level, partners in a supply chain network can share and notify each other securely using multi-layered security authentication, which includes user name and password combinations, SSL certificates, and access restriction based on an Internet Protocol (IP) address of a requesting computer.

The following describes a sample scenario implementing the method described above. Specifically, referring to FIG. 5, a supply chain network for implementing discovery services for aviation parts tracking is illustrated generally by numeral 500.

The airline industry experiences many supply chain related problems that illustrate how adding discovery services completes the RFID solution. First, aircraft parts are expensive to produce because they are custom made for specific aircraft. The ability to track and trace the location and status of each part reduces expenditures resulting from lost parts. Second, each part must be flawless to meet each customer's demand for perfection. Tracking the service record of each part can help to ensure that they are in perfect working order at all times. Third, there are many steps in the life cycle of a given part, which is made more complex by the fact that many parts are in service for several years or even decades. Finally, the entire process of tracking is dependant on multiple partners, including competitors in some cases, which may be difficult to track if other record keeping methods fail.

Figure 5:
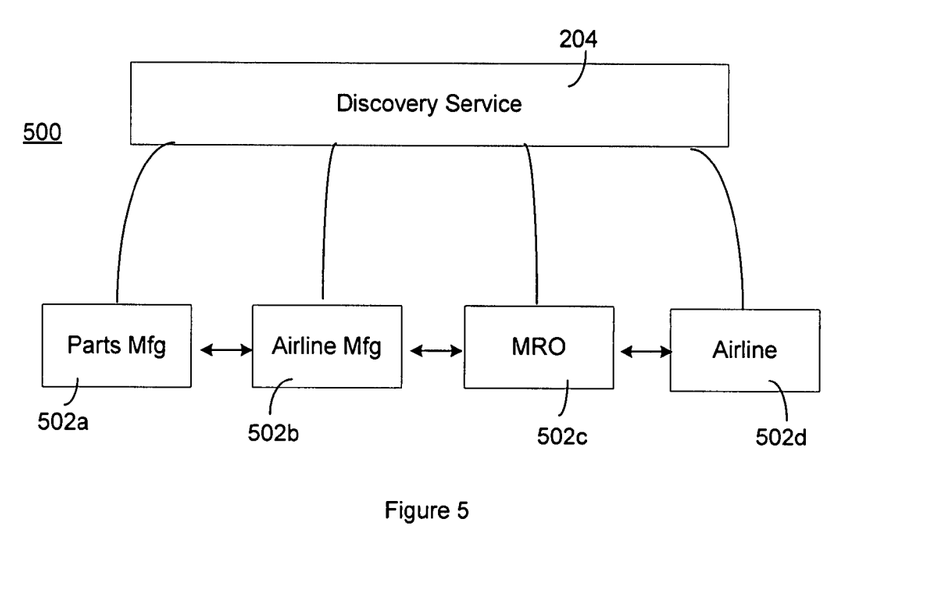
FIG. 5 is an example of a supply chain network.

In the example, the supply chain network comprises four partners: a parts manufacturer 502a; an aircraft manufacturer 502b; an airline maintenance; repair and overhaul (MRO) company 502c; and an airline 502d.

Referring once again to FIG. 4, at step 402, the parts manufacturer 502a posts a create event with the discovery server 106. The create event indicates that the airline supply is entering the supply chain.

At step 404, parts manufacturer 502a posts a transfer-in event to the discovery server 106. The transfer-in event indicates that the supply was received at the parts manufacturer 502a.

At step 406, once the parts manufacturer 502a has finished with the supply, it ships the supply to the aircraft manufacturer 502b and posts a transfer-out event to the discovery server 106. The transfer-out event indicates that the supply was shipped from parts manufacturer 502a.

Steps 404 and 406 are repeated for the airline MRO 502c and the airline 502d, since the airplane will likely travel back and forth between the two for maintenance and repairs over the lifetime of the airplane. At step 410, when the airline 502d decides to sell or retire the airplane, it posts a terminate event with the discovery server 106. The terminate event indicates that the airplane is exiting the supply chain.

Accordingly it will be appreciated that each partner 502a-d in the process records all of its business data in its in-house business application. Relevant tracking events are injected into the discovery service, thereby enabling each downstream partner to have a complete view of where the part has been since it was created.

Therefore, when a first airline takes possession of an aircraft, it can find out where the aircraft was manufactured as well as where each of the individual parts were manufactured. This can be very important for MRO organizations. For example, if a part goes missing and the last event recorded in the discovery service indicates that the MRO never received the part, the ability to track the points of transition in the parts history will reveal whether or not the part left the warehouse of the parts manufacturer.

Further, since each partner in the chain has the ability to determine who has access its information, it has control over its own data. Hence, when a second airline takes control of an aircraft from a first, the second airline can be granted access to view all the relevant event records for the airplane parts by either or both of the MRO and the first airline.

Although the present description refers specifically to RFID for tagging and identifying supplies, it will be appreciated that other object identifiers, such as barcodes, Global Positioning System (GPS) locators and the like could also be implemented, as will be appreciated by a person skilled in the art.

Further, the previous embodiment describes a simple example of a single supply chain network in which all partners are part of a common discovery service. However, it is not uncommon for supply chain networks to overlap and interact with one another. It may be possible that one or more of the partners are associated with a different discovery service that may or may not be operating on the same discovery server 106. For example, an initial supply may begin its lifetime in a factory in China. As the supply passes through a number of Chinese factories, events are posted on a corresponding discovery service. However, once the part reaches a point where it is shipped to a foreign country, such as the U.S., it may join a supply chain network different from the one it originated on. Accordingly, a different discovery service is used to post events for the new supply chain network.

Figure 6:
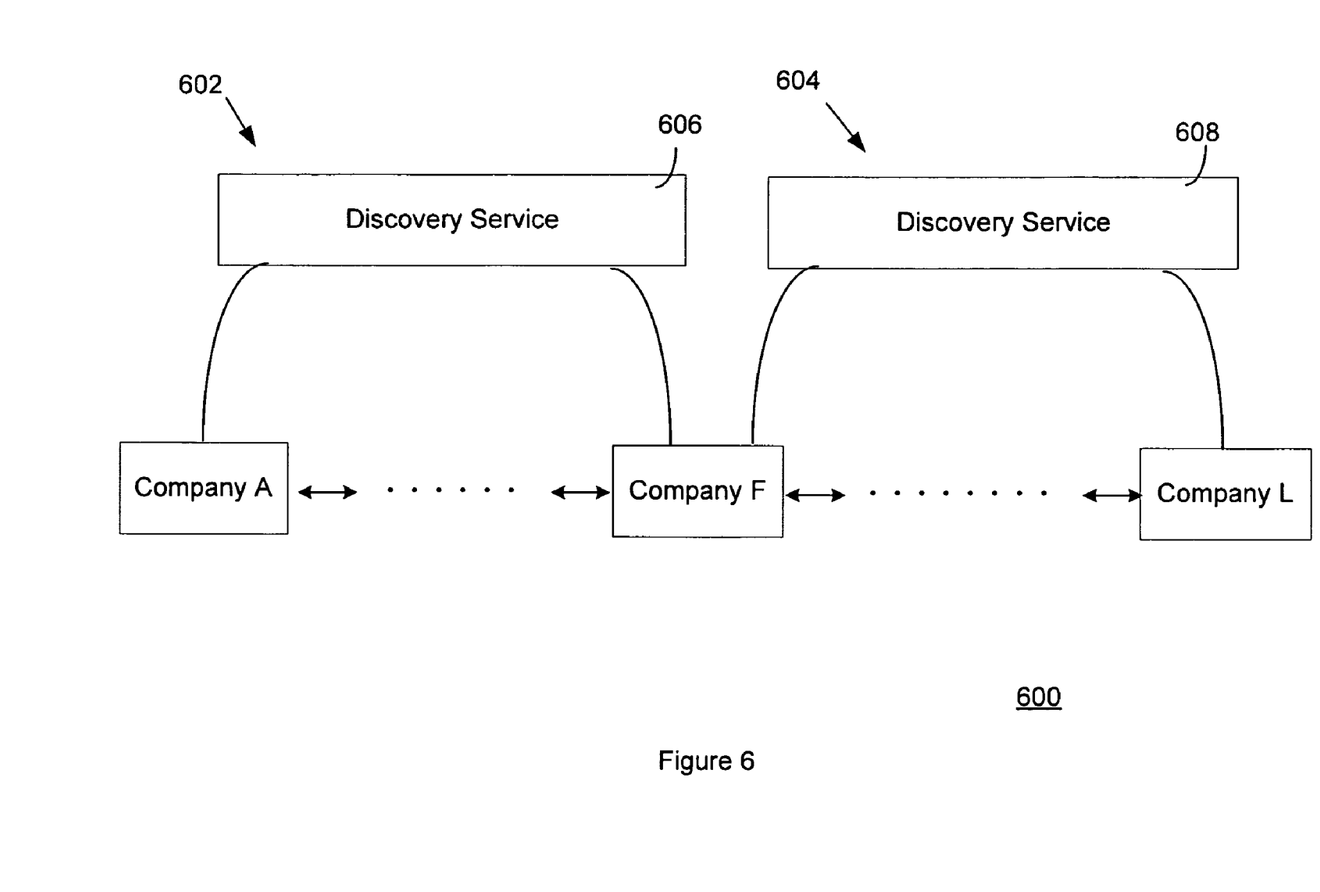
FIG. 6 is a block diagram illustrating two intersecting supply chain networks.

Accordingly, referring to FIG. 6, a dual supply chain network including two related supply chains is illustrated generally by numeral 600. The dual supply chain network 600 comprises a first supply chain 602, a second supply chain 604, a first discovery service 606 and a second discovery service 608. For the most part, the dual supply chain network 600 operates in a similar manner to the supply chain network 200 illustrated in FIG. 2 and described in the previous embodiment. The primary difference arises at the point where the first supply chain 602 and the second supply chain 604 intersect.

In the present embodiment, a common partner 603 is the last partner in the first supply chain 602 and the first partner in the second supply chain 604. Accordingly, communication the common partner is in communication with both the first and second discovery service 606 and 25608, respectively.

Accordingly, in one implementation the common partner 603 is aware that it is participating in two supply chains. Thus, when it posts a create event to the second discovery service 608, it includes a tag that identifies the supply originated from the first supply chain 602. Accordingly, when a query is made on the supply, the second discovery service 608 submits a query to the common partner 603. In turn, the common partner queries the first discovery service 606 and returns the results to the second discovery service 608. The second discovery service 608 can then return a full result set to the querying partner.

In another implementation the common partner 603 is aware that it is participating in two Supply chains. Thus, before it posts a create event to the second supply chain 604, it queries the first supply chain 602 for the supply history. The common partner 603 submits the results of the query along with the create event to the second discovery service 608. Accordingly, it will be appreciated that the second discovery service 608 can provide a full result set to any subsequent query from a partner in the second supply chain 604.

Accordingly, it will be appreciated that discovery services, as described herein, enhance the return on investment of partners participating in a supply chain by potentially saving time, labour, and operating costs, or by potentially increasing sales or customer satisfaction and loyalty. Adding discovery services to a supply chain implementation closes the communication gap by providing the following benefits.

All partners in the supply chain are linked to critical data. The solution interacts seamlessly with existing systems to link each partner to the data. In contrast, other proprietary solutions that typically dictate the orientation of the system create challenges for members of loosely coupled supply chains.

Enhanced audit control and compliance capabilities are implemented. The solution satisfactorily addresses the needs of supply chain regulations by providing a reliable audit trail and being sufficiently flexible so it can meet various compliance requirements.

The solution provides real-time visibility of data across the entire supply chain so that all partners involved have access to the most up-to-date data that is relevant to their business. This includes the current status of an object, where it has been, who has been in contact with it, and when all this occurred.

Lastly, in situations where competitive partners share a supply chain, they are be able to maintain the confidentiality of their data. The solution allows partners to be selective about the information they share and with whom they share it.

The discovery services system supports a customizable extension framework that allows dynamic changes to data exchanged within the system based on customer needs while providing a standard interface to the discovery server.

Using the foregoing specification, the invention may be implemented as a machine, process or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "software" and "application" as used herein are intended to encompass a computer program existent (permanently, temporarily, or transitorily) on any computer-usable medium such as on any memory device or in any transmitting device.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any sub-components or individual parts of one or more processing systems, including software, firmware, hardware, or any combination or sub-combination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

The invention claimed is:

1. A supply chain management network comprising a plurality of discovery servers for tracking a tangible object, identifiable by an object identifier, in a multi-supply chain network, each of the discovery servers being configured to serve a corresponding supply chain in the multi-supply chain network and comprising:
   a communication interface configured:
      to communicate with each of a plurality of partners in the supply chain using a predefined protocol; and
      to communicate with another one of the plurality of discovery servers in order to retrieve information therefrom via a partner common to both the discovery server and the other one of the plurality of discovery servers;
   a data store configured to store events for the object, the events being received from the plurality of partners, wherein each stored event comprises the object identifier, a life cycle step identifying a stage at which the event was generated, a partner identifier identifying which of the plurality of partners is generating the event and a first time stamp; and
   a processor configured to search the data store in response to an inquiry regarding the object from a requesting one of the partners and provide corresponding events to the requesting one of the partners as a result of the search.

2. The supply chain management network of claim 1, wherein the event further comprises additional information sources for providing further details about the event.

3. The supply chain management network of claim 1, wherein the data store is configured to be partitioned periodically in accordance with a classification of the object.

4. The supply chain management network of claim 3, wherein the classification of the object can be modified dynamically.

5. The supply chain management network of claim 3, wherein the classification of the object is determined in accordance with one or both of a frequency at which events are submitted for the object or an expected life cycle of the object.

6. The supply chain management network of claim 1, wherein the processor is further configured to implement a rules engine for applying rules to determine partner access to the events.

7. The supply chain management network of claim 6, wherein predefined ones of the events are hidden from partners who do not have access to the predefined ones of the events.

8. The supply chain management network of claim 1, wherein the discovery server identifies the partner submitting the events and injects the partner identifier to the event once the event is received.

9. The supply chain management network of claim 1 wherein the processor is further configured to provide a notification of the event in accordance with predefined criteria.

10. The supply chain management network of claim 9, wherein the notification is sent to an Object Naming Service when the life cycle step of the event matches a predefined life cycle step.

11. The supply chain management network of claim 9, each discover server further comprising a messaging queue, wherein the notification is placed in the messaging queue to be transmitted to one of the partners in response to a subscription request by the one of the partners.

12. The supply chain management network of claim 1, wherein the processor is further configured to apply a security policy to the events in order to control access thereto.

13. The supply chain management network of claim 12, wherein security policy can be defined on at least one of a user level, a partner level, or a supply chain level.

14. The supply chain management network of claim 1, wherein each stored event further comprises a second time stamp, the first time stamp representing a time at which the event was registered by a corresponding one of the partners and the second time stamp representing a time at which the event was received by the discovery server.

15. The supply chain management network of claim 1, wherein the partner common to both the discovery server and the other one of the plurality of discovery servers is a last partner in the supply chain of the discovery server and a first partner in supply chain of the other one of the plurality of discovery servers.

* * * * *